May 16, 1933.  E. S. CORNELL, JR  1,908,821
BRANCH FITTING FOR PIPES
Filed April 29, 1930   2 Sheets-Sheet 1
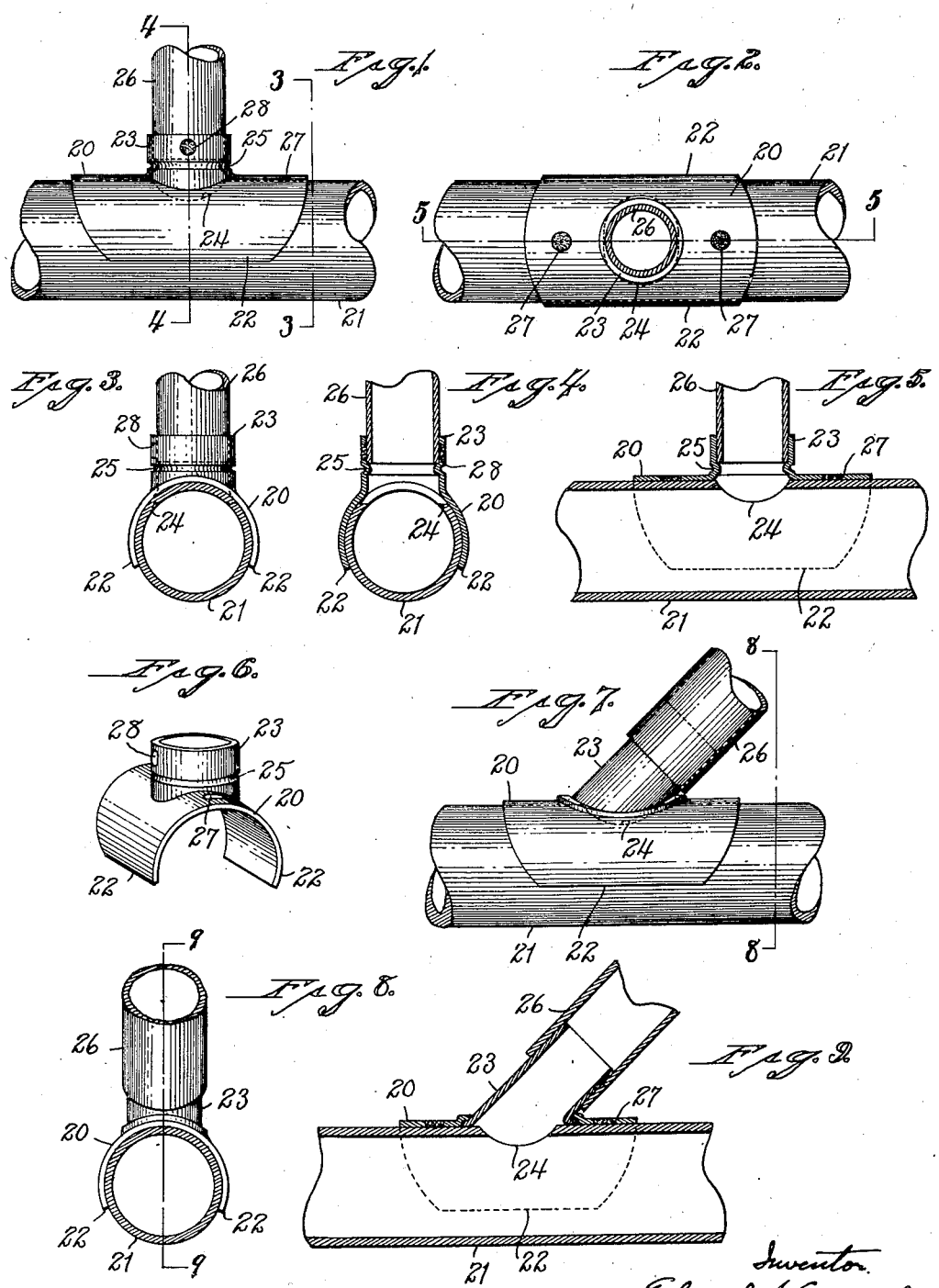

May 16, 1933.　　　E. S. CORNELL, JR　　　1,908,821
BRANCH FITTING FOR PIPES
Filed April 29, 1930　　2 Sheets-Sheet 2
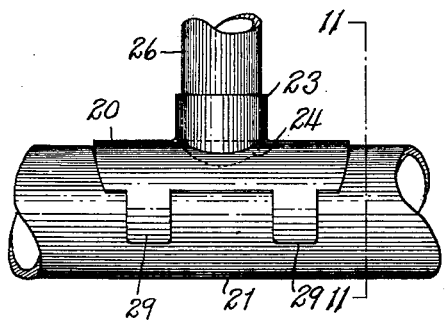
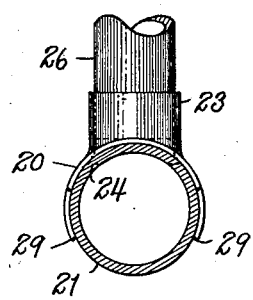
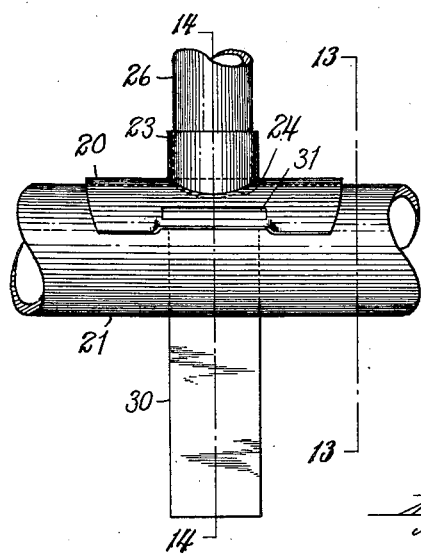
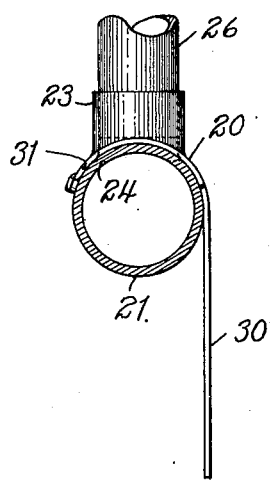
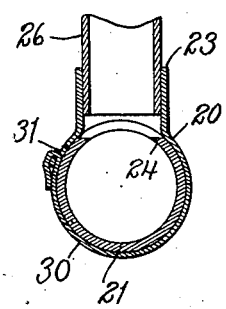

Patented May 16, 1933

1,908,821

UNITED STATES PATENT OFFICE

EDWARD S. CORNELL, JR., OF WATERTOWN, CONNECTICUT, ASSIGNOR TO THE CHASE COMPANIES, INCORPORATED, OF WATERBURY, CONNECTICUT, A CORPORATION

BRANCH-FITTING FOR PIPES

Application filed April 29, 1930. Serial No. 448,234.

This invention relates to an improvement in branch-fittings for pipes and particularly to branch-fittings for use in joining thin-wall tubing.

Heretofore it has been the general practice, when desiring to provide a branch-pipe from a line-pipe, to sever the said line-pipe and thread its adjacent ends for introduction into a threaded branch-fitting such as a T. Other modes of providing a branch-fitting have also been employed, but they have almost universally required the severance of the line-pipe in order to provide a branch line.

The main object of this invention is to provide, at a low cost for manufacture, a branch-fitting, characterized by its adaptability for being readily and conveniently installed upon a continuous pipe from which it is desired to provide a branch line, without requiring the severance thereof.

A further object of my invention is to provide a branch-fitting having the above characteristics and provided with means for temporarily holding it in place upon the pipe from which it is desired to provide a branch line, until adjustments have been made preparatory to soldering or brazing the fitting in place.

With the above and other objects in view as will appear from the following, my invention consists in a branch-fitting for lateral application to the periphery of a continuous pipe from which it is desired to provide a branch, consisting of a saddle cylindrically-contoured to fit the periphery of the said continuous pipe; and a coupling-sleeve carried by and offsetting from the said saddle for the application of a branch-pipe and providing a flow-passage from the said branch-pipe through the said saddle to an opening in the periphery of the said continuous pipe.

My invention further consists in a branch-fitting for pipes characterized as above and having certain other details of construction and combinations and arrangements of parts as will be hereinafter described and particularly recited in the claims.

In the accompanying drawings:

Fig. 1 is a view in side elevation of a branch-fitting embodying my invention shown as applied to a line-pipe and serving to couple a branch-pipe thereto;

Fig. 2 is a top or plan view thereof;

Fig. 3 is a view thereof in transverse section taken on the line 3—3 of Fig. 1;

Fig. 4 is a similar view taken on the line 4—4 of Fig. 1;

Fig. 5 is a central longitudinal sectional view taken on the line 5—5 of Fig. 2;

Fig. 6 is a detached perspective view of the branch-fitting illustrated in the preceding figures;

Fig. 7 is a view in side elevation of another form which a branch-fitting constructed in accordance with my invention may assume, and shown as applied to a line-pipe for the purpose of coupling a branch-pipe thereto;

Fig. 8 is a transverse sectional view taken on the line 8—8 of Fig. 7;

Fig. 9 is a central longitudinal sectional view taken on the line 9—9 of Fig. 8;

Fig. 10 is a view in side elevation corresponding to Fig. 1 and showing another form which a branch-fitting embodying my invention may assume;

Fig. 11 is a transverse sectional view thereof taken on the line 11—11 of Fig. 10;

Fig. 12 is a view in side elevation corresponding to Fig. 10 and showing another form which a branch-fitting constructed in accordance with my invention may assume;

Fig. 13 is a transverse sectional view taken on the line 13—13 of Fig. 12; and

Fig. 14 is a transverse sectional view corresponding to Fig. 13, but showing the attaching-strap wrapped around the line-pipe to secure the fitting in place thereto.

In the embodiment of my invention herein chosen for illustration in Figs. 1 to 6 inclusive, I employ a sheet-metal branch-fitting consisting of a saddle 20, preferably formed of sheet-metal and cylindrically-contoured, as clearly shown in the drawings, to snugly fit the periphery of what I shall for convenience of description refer to as a main-line pipe 21, over which it is adapted to be laterally slipped.

Preferably and as shown in the drawings, the said saddle in cross-section is of a length slightly in excess of a semi-circle, to provide gripping-wings 22 at its respective opposite edges which, as particularly illustrated in Figs. 3 and 4, reach sufficiently down beyond the center of the main-line pipe 21 so as to, in a sense, embrace the same to yieldingly hold the same to the said pipe for the purpose as will hereinafter appear.

Centrally projecting from the saddle 20 is an integral sleeve 23 arranged in line with an opening 24 in the main-line pipe 21 and formed with an inwardly-spun bead or seat 25 forming a stop for a branch-line pipe 26 inserted into the coupling-sleeve 23 of the fitting.

For the purpose of permanently securing the fitting by means of solder or brazing, the saddle of the fitting is provided with perforations 27 at points diametrically on opposite sides of the sleeve 23. Similarly, the sleeve 23 itself is provided with perforations 28 for the purpose of facilitating the soldering or brazing of the branch-line pipe 26 in place in the said sleeve.

In installing my improved branch-fitting, the main-line pipe 21 or other pipe from which it is desired to provide a branch line is first provided with the opening 24, already referred to, after which my improved branch-fitting is applied laterally to the said pipe so as to bring the coupling-sleeve 23 in line with the opening 24, at which time the gripping-wings 22 formed by the ends of the saddle will have sufficiently gripped the pipe 21 to retain the fitting in place thereto.

With the fitting temporarily retained in place upon the main-line pipe 21 by means of the gripping-wing 22 ample opportunity is given the mechanic to align the coupling-sleeve 23 with the hole 24 preparatory to soldering or otherwise securing the fitting in place.

Having correctly positioned the branch-fitting upon the main-line pipe 21, solder is applied to the perforations 27 in the saddle 20 and will spread therefrom in a thin film between the under face of the said saddle and that portion of the periphery of the main-line pipe 21 covered thereby. Similarly, the branch-line pipe 26 after having been inserted into the coupling-sleeve 23, is secured in place by applying solder to the perforations 28.

In the form of branch-fitting shown in Figs. 7, 8 and 9, instead of forming the coupling-sleeve 23 integral with the saddle 20, the same is separately formed and inclined, as shown, at an angle of forty-five degrees with respect to the axis of the said saddle and hence with respect to the axis of the main-line pipe 21 to form what is commonly known as a Y fitting. In this instance, also, instead of entering the branch-line pipe 26 into the interior of the coupling-sleeve 23, it has been sleeved over the exterior thereof, which is a practice which obviously may be followed in connecting the branch-line pipe 26 to any of the forms of branch-fitting herein shown.

In the form of branch-fitting shown in Figs. 10 and 11, instead of making the saddle proper 20 sufficiently extensive in cross-section to provide the gripping-wings 22 for holding the fitting in place upon the main-line pipe 21, I employ a less extensive saddle and form the same upon its respective opposite side edges with depending gripping-fingers 29 which reach beyond the center line of the main-line pipe 21 and effectively discharge the retaining function of the gripping-wings 22 of the forms illustrated in the preceding figures.

Instead of employing resilient wings or fingers for holding the branch-fitting in place upon the main-line pipe 21, I may, as shown in Figs. 12, 13 and 14, provide one edge of the saddle 20 with a relatively long strap-like extension 30 which is adapted to be wrapped around the periphery of the pipe and passed through a slot 31 in the opposite edge of the saddle, after which it is reversely folded, as shown in Fig. 14, to provide an effective attachment for securing the branch-fitting in place upon the main-line pipe until the same can be adjusted and permanently attached by solder or other suitable means.

By means of my invention, I am enabled to couple in a branch-pipe to any main-line pipe or other pipe from which it is desired to provide a branch, without requiring the severance of the pipe in question.

Preferably and as herein shown, my improved branch-fitting is provided with retaining-means for temporarily securing it in place upon the pipe from which it is desired to provide a branch line, while the fitting is being positioned and aligned so that both hands of the mechanic may be left free for soldering, brazing or otherwise securing the fitting in place once it has been positioned as described.

It will be understood by those skilled in the art that my invention may assume varied physical forms without departing from my inventive concept and I, therefore, do not limit myself to the specific embodiment herein chosen for illustration, but only as indicated in the appended claims.

I claim:

1. As a new article of manufacture, a branch-fitting for lateral application to the periphery of a pipe intermediate the ends thereof, said fitting having an annular coupling-sleeve and provided with an arcuate saddle formed of sheet-metal of substantially uniform thickness throughout; the said saddle diverging from the base of the said coupling-sleeve to provide a continuous outturned sweating flange entirely therearound substantially conforming to the form of the said pipe and when applied thereto embracing said pipe to an extent only slightly in excess of a semicircle, said saddle providing a means whereby the fitting may be frictionally engaged with said pipe and held in predetermined desired relation thereon prior to and during the operation of being solidly and rigidly sweated thereto.

2. As a new article of manufacture, a sheet-metal branch-fitting for lateral application to the periphery of a pipe intermediate the ends thereof, said fitting comprising an annular coupling-sleeve and a resilient arcuate saddle; the said saddle diverging from the base of the said coupling-sleeve to provide a continuous sweating flange therearound substantially conforming to the form of the said pipe and embracing said pipe only slightly in excess of a semicircle, the form of said saddle enabling it to be snapped over and frictionally grip the said pipe for holding the fitting in place prior to and during a sweating operation.

3. As a new article of manufacture, a sheet-metal branch-fitting for lateral application to the periphery of a pipe intermediate the ends thereof, said fitting comprising an annular coupling-sleeve and a resilient arcuate saddle formed integral therewith; the said saddle diverging from the base of the said coupling-sleeve to provide a continuous out-turned sweating flange therearound substantially conforming to the form of the said pipe and embracing same for an appreciable area to enable the fitting to be sweated thereto, said saddle when applied to said pipe lying contiguous thereto to an extent slightly in excess of one-half the circumference of said pipe, thus enabling the saddle to be snapped over and grip the said pipe for holding the fitting in place prior to and during a sweating operation.

4. As a new article of manufacture, a sheet-metal branch-fitting for lateral application to the periphery of a pipe intermediate the ends thereof, said fitting comprising an annular coupling-sleeve and a resilient arcuate saddle; the said saddle diverging from the base of the said coupling-sleeve to provide a continuous sweating flange therearound substantially conforming to the form of the said pipe and provided with resilient gripping-fingers embracing said pipe only slightly in excess of a semicircle, the form of said saddle enabling it to be snapped over and frictionally grip the said pipe for holding the fitting in place prior to and during a sweating operation.

5. As a new article of manufacture, a sheet-metal branch-fitting for lateral application to the periphery of a pipe intermediate the ends thereof, said fitting comprising an annular coupling-sleeve and a resilient arcuate saddle; the said saddle diverging from the base of the said coupling-sleeve to provide a continuous sweating flange therearound substantially conforming to the form of the said pipe and embracing said pipe only slightly in excess of a semicircle, the form of said saddle enabling it to be snapped over and frictionally grip the said pipe for holding the fitting in place prior to and during a sweating operation, said saddle perforated to provide for the introduction of solder between it and the pipe.

6. As a new article of manufacture, a sheet-metal branch-fitting for lateral application to the periphery of a pipe intermediate the ends thereof, said fitting comprising an annular coupling-sleeve for the reception of a branch-pipe, and a resilient arcuate saddle; the said saddle diverging from the base of the said coupling-sleeve to provide a continuous sweating flange therearound substantially conforming to the form of the said pipe and embracing said pipe only slightly in excess of a semicircle, the form of said saddle enabling it to be snapped over and frictionally grip the said pipe for holding the fitting in place prior to and during a sweating operation, said saddle and coupling-sleeve perforated to provide for the introduction of solder between them and the two said pipes.

7. As a new article of manufacture, a sheet-metal branch-fitting for lateral application to the periphery of a pipe intermediate the ends thereof, said fitting comprising an annular coupling-sleeve and a resilient arcuate saddle; the said saddle diverging from the base of the said coupling-sleeve to provide a continuous sweating flange therearound substantially conforming to the form of the said pipe and embracing said pipe only slightly in excess of a semicircle, the form of said saddle enabling it to be snapped over and frictionally grip the said pipe for holding the fitting in place prior to and during a sweating operation, said coupling-sleeve being separable from said saddle.

In testimony whereof, I have signed this specification.

EDWARD S. CORNELL, JR.